United States Patent [19]

Takeuchi et al.

[11] Patent Number: 5,493,110

[45] Date of Patent: Feb. 20, 1996

[54] LIGHT FREQUENCY SYNTHESIZER

[75] Inventors: Nobunari Takeuchi; Tekken Lee; Haruyoshi Uchiyama, all of Tokyo; Kaoru Shimizu; Tsuneo Horiguchi, both of Mito, all of Japan

[73] Assignees: Ando Electric Co. Ltd.; Nippon Telegraph and Telephone Corporation, both of Tokyo, Japan

[21] Appl. No.: 265,839

[22] Filed: Jun. 24, 1994

[30] Foreign Application Priority Data

Jun. 30, 1993 [JP] Japan ..................... 5-162933

[51] Int. Cl.⁶ .................. G01J 1/32; H01S 3/13
[52] U.S. Cl. ............. 250/205; 250/227.23; 356/349; 372/32
[58] Field of Search .............. 250/205, 227.23, 250/227.24, 227.27, 201.1; 356/349; 372/29, 32; 359/187, 188

[56] References Cited

U.S. PATENT DOCUMENTS

| | | | |
|---|---|---|---|
| 5,153,888 | 10/1992 | Imamura et al. | 372/32 |
| 5,167,444 | 12/1992 | Hall | 372/32 |
| 5,432,629 | 7/1995 | Shikada et al. | 359/124 |
| 5,438,578 | 8/1995 | Lee et al. | 250/201.1 |

*Primary Examiner*—Stephone B. Allen
*Attorney, Agent, or Firm*—Finnegan, Henderson, Farabow, Garrett & Dunner

[57] ABSTRACT

A reference light generating mechanism generates reference light, a light frequency component of which varies in a stepped manner at fixed intervals, repeatedly at pre-specified cycles, and generates a timing signal in accordance with this variance. A detecting mechanism detects a frequency difference between a reference light frequency freely selected from among the light frequency component and a feedback light frequency of feedback light fed back so as to conform to the reference light frequency, and synchronizes this with a timing signal, and an output light generating mechanism generates output light, the light frequency of which is controlled in accordance with the frequency difference, and conducts the feedback of this output light to the detecting mechanism as feedback light.

2 Claims, 4 Drawing Sheets

LIGHT FREQUENCY SYNTHESIZER

BACKGROUND OF THE INVENTION

1. Field of the Invention

The present invention relates to a light frequency synthesizer which is capable of stably generating CW (continuous wave) light at a freely selected light frequency.

2. Prior Art

Recently, light frequency synthesizers which generate CW light at a pre-specified light frequency have been developed. An example of this type of light frequency synthesizer is shown in FIG. 5. In FIG. 5, reference numeral 32 indicates an input terminal to which a reference electric signal is supplied, and reference numeral 27 indicates a comparison circuit which compares a reference electric signal inputted from the input terminal 82 with a feedback signal described hereinbelow, and which generates a difference signal indicating the difference in the two signals. Reference numeral 28 indicates a light frequency control circuit, which generates a light frequency control signal in accordance with the difference signal supplied from the comparison circuit 27.

Reference numeral 29 indicates an E/O (Electrical signal to Optical signal) conversion circuit; this generates CW light at a light frequency in correspondence with the light frequency control signal supplied from light frequency control circuit 28. Reference numeral 30 indicates a directional coupler, which conducts the CW light outputted from E/O conversion circuit 29 to optical output terminal 33, and which supplies a portion of the CW light to light frequency discriminating 31. Light frequency discriminating 31 discriminates the light frequencies of the CW light outputted from E/O conversion circuit 29, generates an electrical signal indicating this light frequency, and supplies this electrical signal to comparison circuit 27 as the feedback signal described above.

In this manner, by means of the conventional light frequency synthesizer, the feedback control of a closed loop was conducted. That is to say, the CW light outputted from E/O conversion circuit 29 passes through directional coupler 30 and is inputted into light frequency discriminating circuit 31, and is converted to the feedback signal proportional to the light frequency. In comparison circuit 27, the feedback signal and the reference electrical signal are compared, and based on the results of this comparison, the light frequency control circuit 28 controls the light frequency of the E/O conversion circuit 29.

In the conventional light frequency synthesizer described above, in the case in which the closed loop gain is sufficiently large, the degree of stability of the frequency of the CW light is determined by the operational characteristics of the light frequency discriminating circuit 31. Normally, there were a great number of cases in which a Fabry-Perot resonator was employed in the light frequency discriminating circuit 31. However, Fabry-Perot resonators commonly possess a plurality of resonance frequencies, so that it was unclear at which resonance point resonance would occur, and there were flaws in that the absolute value of the light frequency was unclear, it was impossible to control frequencies greater than the resonance interval, and furthermore, such resonators were susceptible to disturbances such as temperature or the like. Accordingly, in structures employing light frequency discriminating circuits 31 having such defects, there was a problem in that it was impossible to generate stable CW light by means of freely selected light frequencies.

SUMMARY OF THE INVENTION

The present invention was created in light of the above circumstances; it has as an object thereof to provides light frequency synthesizer which is capable of generating stable CW light at freely selected light frequencies.

In order to achieve the above object, the present invention is characterized in being provided with: a reference light generating mechanism, which generates reference light, the light frequency component of which varies in a stepped manner at specified intervals, repeatedly at pre-specified cycles, and generates a timing signal in accordance with this variance; a detecting mechanism, which detects a frequency difference between a reference light frequency freely selected from among the light frequency components, and a feedback light frequency of feedback light which is fed back in such a manner as to conform to the reference light frequency, and synchronizes this with the timing signal; and an output light generating mechanism, which generates output light having a light frequency which is controlled in accordance with the frequency difference, and which supplies a portion of the output light to the detecting mechanism as the feedback light.

In accordance with the above structure, the reference light generating mechanism generates reference light, the light frequency component of which changes in a stepped manner at fixed periods, repeatedly at pre-specified cycles, and generates a timing signal in correspondence with this variance, and the detecting mechanism detects a frequency difference between the reference light frequency which is freely selected from among the light frequency components, and the feedback light frequency of the feedback light fed back in such a manner as to conform to this reference light frequency, and synchronizes this with the timing signal. In addition, in the output light generating mechanism, output light is generated, the light frequency of which is controlled in accordance with the frequency difference detected by the detecting mechanism, and a portion of the output light is fed back to the detecting mechanism as the feedback light. As a result, feedback control is executed so that the frequency difference between a regulated freely selected reference light frequency and the feedback light frequency is canceled, so that it is possible to create regulated output light by means of a freely selected light frequency.

DETAILED DESCRIPTION OF THE PREFERRED EMBODIMENTS

Hereinbelow, an embodiment of the present invention will be explained with reference to the Figures.

A. Structure of the Embodiment

Figure 1:
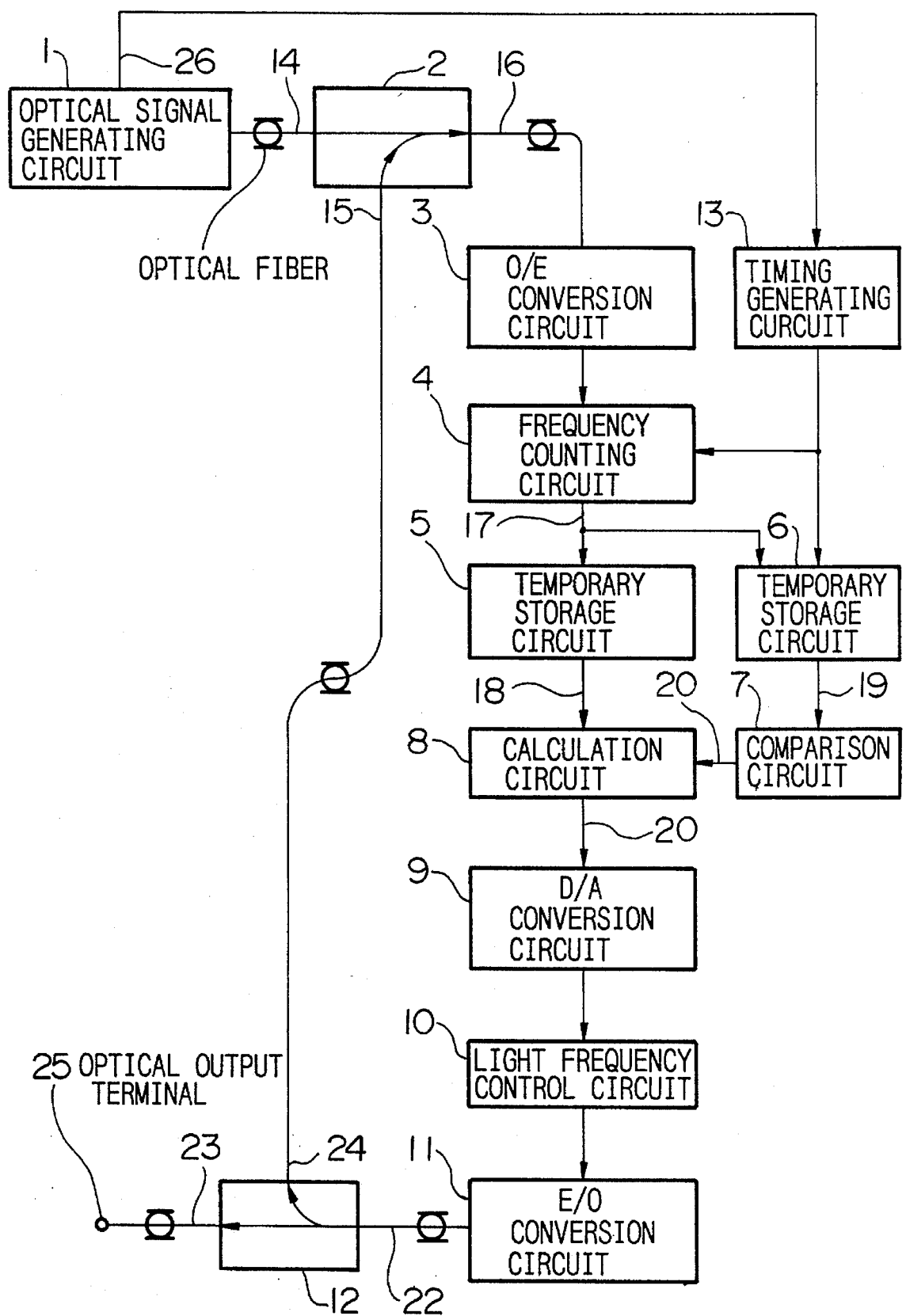
FIG. 1 is a block diagram showing the structure of an embodiment in accordance with the present invention.
Figure 2:
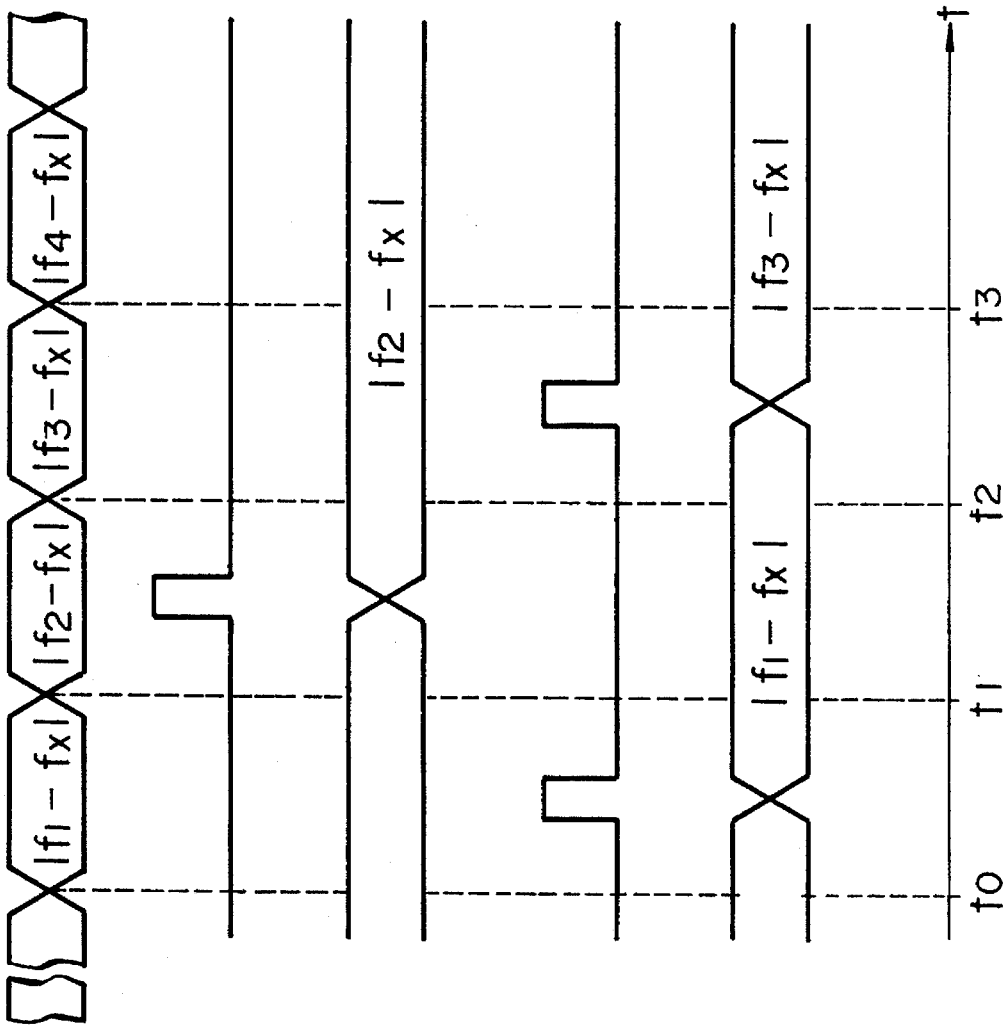
FIG. 2 is a diagram for explaining the optical signal generated by a light frequency control circuit 1 in the same embodiment.

FIG. 1 is a block diagram showing the overall structure of an embodiment in accordance with the present invention. In the FIGURE, reference numeral 1 indicates an optical signal generating circuit, which outputs CW light, the light frequency of which repeatedly varies in a stepped manner at predetermined cycles. That is to say, in this optical signal generating circuit 1, as shown in FIG. 2, if time is expressed by t, and the light frequency is expressed by f, then within a range in which $t_0 < t < t_n$, a light frequency having the stepped form:

$$\begin{aligned} f = \quad & f_1 & & t_0 < t < t_1 \\ & f_2 = f_1 + \Delta f & & t_1 < t < t_2 \\ & f_3 = f_1 + 2\Delta f & & t_2 < t < t_3 \\ & f_n = f_1 + (n-1)\Delta f & & t_{n-1} < t < t_n \end{aligned}$$

is repeatedly output at cycles of $1/t_n$.

Furthermore, optical signal generating circuit 1 repeatedly generates a synchronization signal synchronized to a cycle of $1/t_n$ and outputs this from synchronization signal output terminal 26. The details of this type of optical signal generating circuit 1 are disclosed in "Technique for translating light-wave frequency by using an optical ring circuit containing a frequency shifter, OPTICS LETTERS, Vol. 17, No. 18, Sept. 15, 1992, by Kaoru Shimizu".

Reference numeral 2 indicates a directional coupler, which mixes the optical signal supplied to input terminal 14 and the feedback optical signal (discussed hereinbelow) supplied to input terminal 15, and outputs an optical signal corresponding to the mixed result via output terminal 16. The output optical signal of directional coupler 2 has a frequency component corresponding to the difference between the light frequency of the optical signal and the light frequency of the feedback optical signal. Reference numeral 3 indicates an O/E conversion circuit, which generates a difference frequency signal (electrical signal) indicating the difference between the light frequency of the optical signal supplied from directional coupler 2 and the light frequency of the feedback optical signal discussed hereinbelow.

Reference numeral 13 indicates a timing generating circuit which generates timing signals synchronized with the synchronization signal outputted from optical signal generating circuit 1. The timing signals are generated at timing which is determined based on the desired frequency of the output light of this synthesizer which is to be generated. Reference numeral 4 indicates a frequency counting circuit, which counts the frequency of the frequency signal supplied from O/E conversion circuit 3 based on the above timing signal, and outputs this as frequency data. Reference numerals 5 and 6 indicate temporary storage circuits comprising registers and the like, which temporarily store and output the frequency data described above at differing times in accordance with the timing signal supplied from timing generating circuit 13. The output of temporary storage circuit 5 is inputted into calculation circuit 8, and the output of temporary storage circuit 6 is inputted into comparison circuit 7.

Comparison circuit 7 compares the size relationships of the frequency data which were previously written in and the frequency data which were subsequently written in, and outputs the results of this comparison. Calculation circuit 8 determines the positive or negative sign of the output values of the temporary storage circuit 5 in accordance with the results of the comparison supplied from comparison circuit 7, and outputs this. Reference numeral 9 indicates a D/A conversion circuit, which converts the output of calculation circuit 8 to an analog signal and outputs this. Reference numeral 10 indicates a light frequency control circuit which generates an optical control signal in accordance with the output of D/A conversion circuit 9.

Reference numeral 11 indicates an E/O conversion circuit, which generates CW light having a light frequency corresponding to the optical control signal. The CW light outputted by E/O conversion circuit 11 is connected to input terminal 22 of directional coupler 12. Directional coupler 12 outputs a light output signal from output terminal 23, and supplies a portion of this light output signal from output terminal 24 to input terminal 15 of directional coupler 2 as a feedback light signal.

B. Operation of the Embodiment

Figure 3:
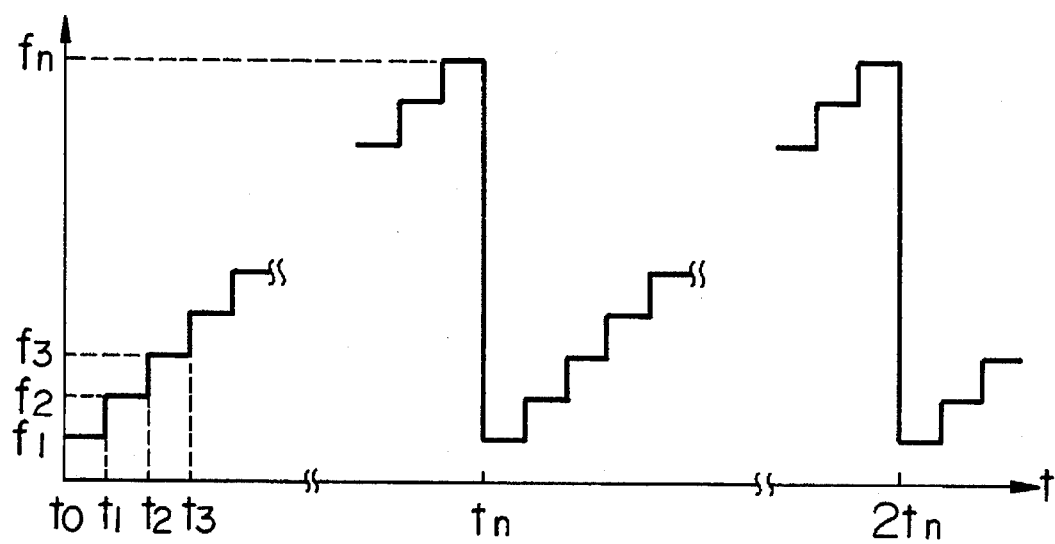
FIG. 3 is a diagram for explaining the output of a frequency counting circuit 4 in the same embodiment.
Figure 4:
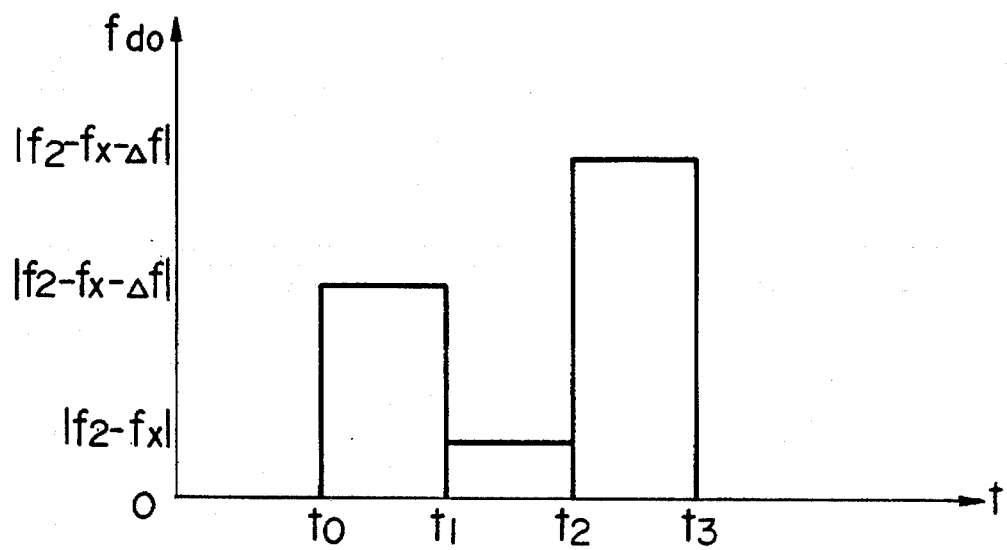
FIG. 4 is a diagram explaining the operation of the same embodiment.
Figure 5:
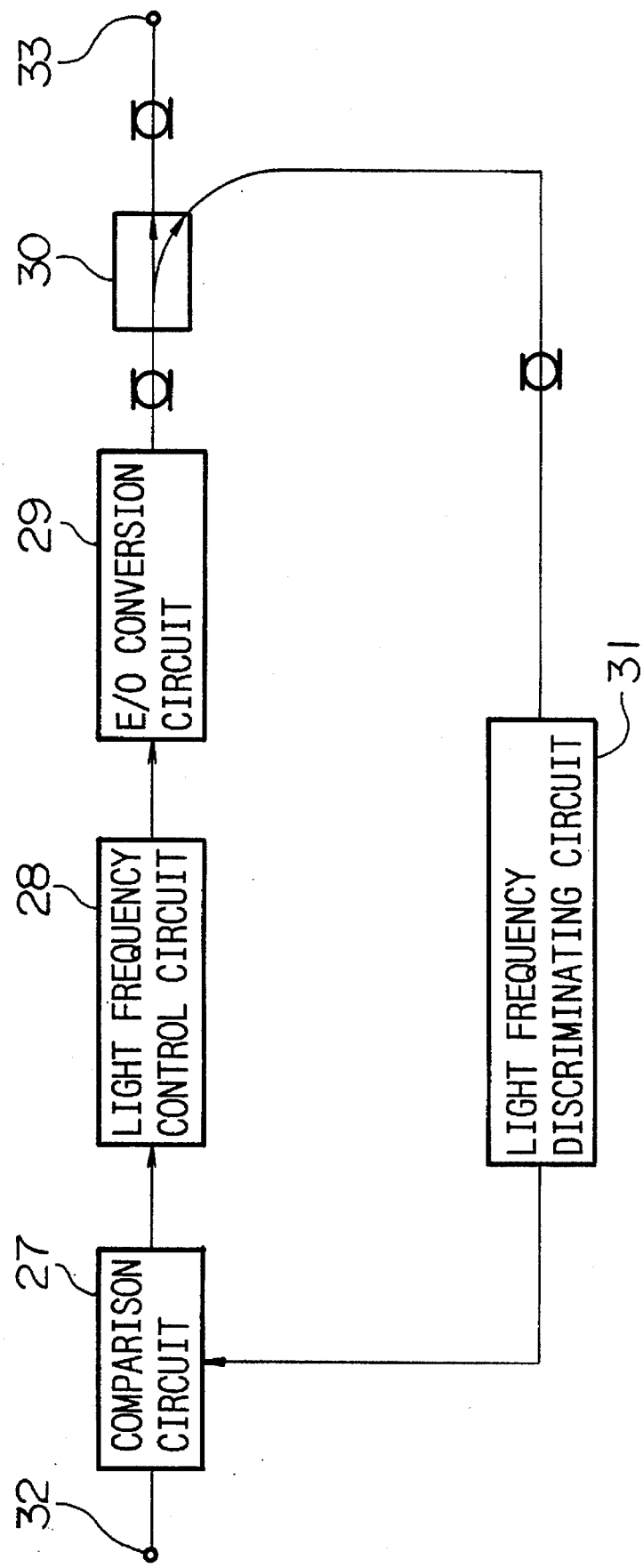
FIG. 5 is a diagram explaining a conventional example.

Next, with reference to FIGS. 2 through 4, the operation of the light frequency synthesizer having the above structure will be explained. Here, the case in which the light frequency of the CW light generated by the light frequency synthesizer is $f_2$ will be used as an example, and the explanation will proceed on this basis. Furthermore, the output light of E/O conversion circuit 11 will be assumed to have light frequency $f_x$ within the time range of $t_0 < t < t_3$. In this case, both light frequency f and light frequency $f_x$, and a beat frequency, are inputted into O/E conversion circuit 3. Light frequency f is a frequency close to light frequency $f_x$.

First, if the wavelength of the optical signal outputted from optical signal generating circuit 1 is set at, for example, 1.55 mm, then the light frequency $f_1$ thereof is 193.4 THz. Furthermore, in the case in which the variation width $\Delta f$ of the light frequency $f_n$ in circuit 1 is set at 100 MHz, the number of steps n is set to 100, and the step width is set to 50 μs, then, as shown by the following formulas, the optical signal generating circuit 1 repeatedly generates an optical signal having a light frequency $f_n$ at intervals of 5 ms.

$$\begin{aligned} f = \quad & f_1 = & & 193.400000 \text{ THz} & & \dots & & 0 < t < 50 \text{ μs} \\ & f_2 = & & 193.400100 \text{ THz} & & \dots & & 50 \text{ μs} < t < 100 \text{ μs} \\ & f_3 = & & 193.400200 \text{ THz} & & \dots & & 100 \text{ μs} < t < 150 \text{ μs} \\ & \vdots & & & & & & \vdots \\ & f_n = & & 193.410000 \text{ THz} & & \dots & & 4950 \text{ μs} < t < 5000 \text{ μs} \\ & f_{n+1} = & & 193.400000 \text{ THz} & & \dots & & 5000 \text{ μs} < t < 5050 \text{ μs} \end{aligned}$$

An optical signal varying in this manner is supplied to O/E conversion circuit 3 via directional coupler 2. In O/E circuit 3, varying frequency components including light frequencies $f_n$, $f_x$, $f_n + f_x$, and $f_n - f_x$ are formed, and among these, the light frequency $f_n - f_x$, which is the passband of directional coupler 2, is outputted as difference frequency signal fd0. As shown in FIG. 3, this difference frequency signal fd0 expresses a relationship such that:

$$\begin{aligned} fd0 = \quad & |f_1 - f_x| = & & |f_2 - f_x - \Delta f| & & \dots & & t_0 < t < t_1 \\ & |f_2 - f_x| = & & |f_2 - f_x| & & \dots & & t_1 < t < t_2 \\ & |f_3 - f_x| = & & |f_2 - f_x + \Delta f| & & \dots & & t_2 < t < t_3 \end{aligned}$$

Here, for example, if, in the range 0<t<150 μs, the light frequency $f_x$ of the feedback light signal is taken to be 193.40090 THz, then the difference frequency signal fd0 has the following values.

$$fd0 = \begin{cases} |f_1 - f_x| = & 90 \text{ MHz} & 0 < t < 50 \text{ μs} \\ |f_2 - f_x| = & 10 \text{ MHz} & \ldots \quad 50 \text{ μs} < t < 100 \text{ μs} \\ |f_3 - f_x| = & 110 \text{ MHz} & \ldots \quad 100 \text{ s} < t < 150 \text{ μs} \end{cases}$$

These difference frequency signals fd0 are supplied to frequency counting circuit 4. On the other hand, the timing signals are generated at timing which is determined based on the desired frequency $f_2$ of the output light of this synthesizer which is to be generated. In frequency counting circuit 4, the frequency differences fd0 within time ranges in which the light frequency f of the optical signal varies are calculated in accordance with the timing signal supplied from timing generating circuit 13, and in such a manner that $t_0 < t < t_1$, $t_1 < t < t_2$, ..., and these are outputted to temporary storage circuit 5 and temporary storage circuit 6. Temporary storage circuit 5 and temporary storage circuit 6 temporarily store the output of frequency counting circuit 4 in accordance with the timing shown in FIG. 4, and output these values.

Temporary storage circuit 5 temporarily stores the output value $|f_2-f_x|$ of frequency counting circuit 4 within the range $t_1 < t < t_2$, and outputs this value to operational circuit 8. Temporary storage circuit 6 temporarily stores the output value of frequency calculating circuit 4 in the ranges $t_0 < t < t_1$, and $t_2 < t < t_3$, that is to say, $|f_1-f_x|$ and $|f_3-f_x|$, and outputs these values in order to comparison circuit 7.

In comparison circuit 7, the inputted values $|f_1-f_x|0$ and $|f_3-f_x|$ are compared, and the results thereof are supplied to operational circuit 8 as values such as those shown in the following table. That is to say, comparison circuit 7 generates the polarity (positive or negative) of $f_2-f_x$.

| Condition of the Inputted Values | Outputted Value |
|---|---|
| $|f_1 - f_x| < |f_3 - f_x|$ | +1 |
| $|f_1 - f_x| = |f_3 - f_x|$ | 0 |
| $|f_1 - f_x| > |f_3 - f_x|$ | −1 |

In the case of the example described above, the conditions are such that $|f_1-f_x|=90$ MHz $< |f_3 f_x|=110$ MHz, so that comparison circuit 7 outputs a value of "+1".

Then, in operational circuit 8, operations are conducted in accordance with the comparison results supplied from comparison circuit 7, and $|f_2-f_x| \times (+1) = 10$ MHz $\times (+1) = 10$ MHz is outputted. Light frequency control circuit 10 controls the light frequency $f_x$ of E/O conversion circuit 11 so as to increase by 10 MHz. That is to say, light frequency control circuit 10 controls E/O conversion circuit 11 so that light frequency $f_x$ varies in accordance with the inputted values.

For example, in the case in which this E/O conversion circuit 11 comprises a distributed feedback type semiconducting laser having a InGaAs multiplex quantum well structure, it is possible to vary the light frequency by controlling the temperature and the current. For example, in the case in which the temperature is varied, the light frequency $f_x$ is controlled at 12 GHz/° K., and in the case in which the current is varied, the light frequency varies at 200 Mtz/mA. Accordingly, in the case corresponding to the above example, if the temperature of the semiconducting laser is not varied, and the current is reduced by 0.05 mA, then the light frequency $f_x$ increases by 10 MHz. In this way, the outputted light frequency $f_x$ of the E/O conversion circuit 11 becomes 193.400090 THz+10 MHz=193.4001000 THz, and is brought into conformity with the target value.

This control operation is conducted in each cycle, that is to say, at intervals of 50 μs×100=5 ms, and thereby, it is possible to stably maintain the light frequency $f_x$ of the optical signal. Moreover, by altering the timing signal cycle outputted from the timing generating circuit 13, it is possible to output a freely selected light frequency $f_1, f_2, \ldots, f_n$. The output light frequency $f_x$ of the E/O conversion circuit 11 was set to $f_x$ within the range $t_0 < t < t_3$; however, in actuality, in the range $t_2 < t < t_3$, in which the light frequency control circuit 10 exerts control, this is altered (controlled) to $f_2$.

The output light frequency of this E/O conversion circuit 11, which was $f_x$ in the range $t_0 < t < t_3$, is controlled at the target value of $f_2$. The same type of control is repeated in the range $t_n < t < 2t_n$, and the output light frequency of the E/O conversion circuit 11 is regulated. The same type of control is repeated over the range $Nt_n < t < (N+1)t_n$ (here, N represents an integer).

In this manner, in the embodiment described above, an optical signal, the light frequency whereof varies in a stepped manner at predetermined cycles, is repeatedly outputted, and a E/O conversion circuit 11 is subjected to feedback control so that the frequency difference between a light frequency $f_i$ of this optical signal (here, i is an integer within a range of $1 < i < n$), and a light frequency $f_x$ comprising a target value is canceled, so that it is possible to lock output light frequency $f_x$ freely at a light frequency $f_i$ of the optical signal generated by optical signal generating circuit 1. Optical signal generating circuit 1 has an absolute value of the optical frequency which is clear, and moreover, a stable light frequency can be obtained so that the light frequency of the E/O conversion circuit 11 is also stabilized. As a result, a light frequency synthesizer is realized which generates a light frequency regulated by a freely selected light frequency.

What is claimed is:

1. A light frequency synthesizer comprising:

reference light generating means, which generates reference light, the light frequency component of which varies in a stepped manner at specified intervals, repeatedly at pre-specified cycles, and generates a timing signal in accordance with this variance;

detecting means, which detects a frequency difference between a reference light frequency freely selected from among the light frequency components, and a feedback light frequency of feedback light which is fed back in such a manner as to conform to the reference light frequency, and synchronizes this with the timing signal; and output light generating means, which generates output light having a light frequency which is controlled in accordance with said frequency difference, and which supplies a portion of said output light to said detecting means as said feedback light.

2. A light frequency synthesizer according to claim 1 further comprising:

memory means which stores the frequency differences detected by the detecting means at timing corresponding to a desired frequency of the output light of the synthesizer, whereby the output light generating means controls the frequency of the output light based on the frequency differences stored in the memory means.

* * * * *